UNITED STATES PATENT OFFICE.

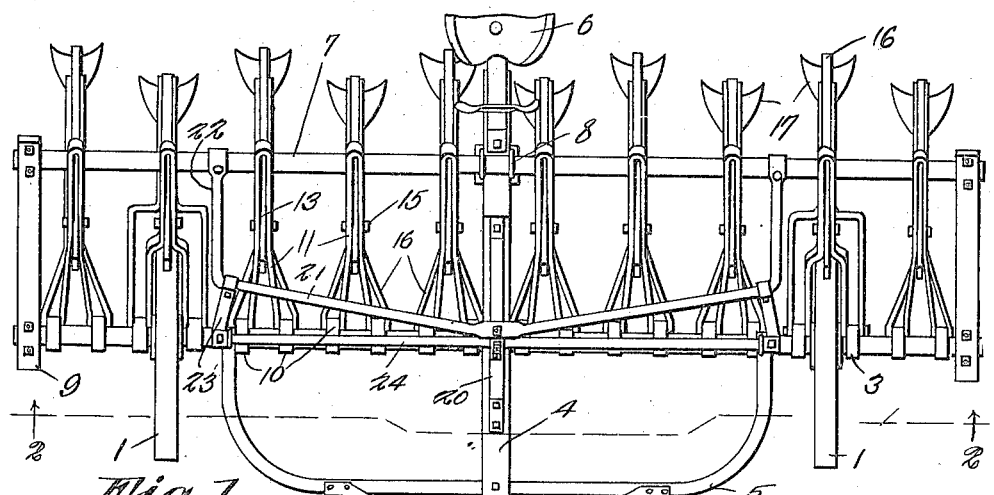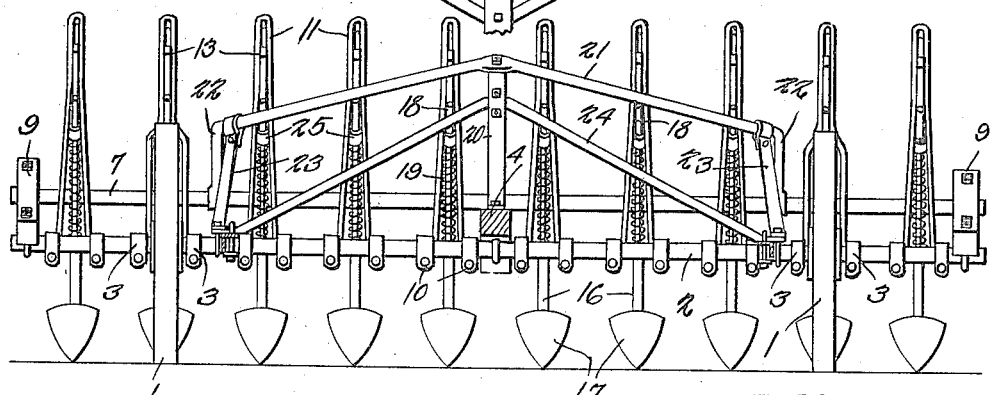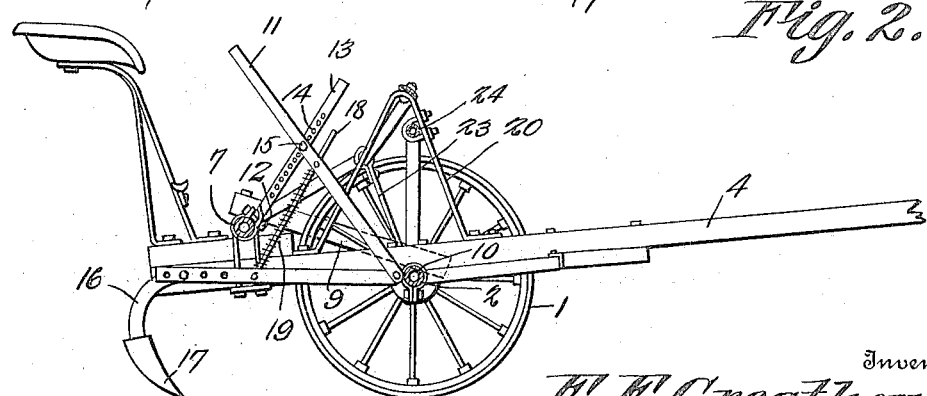

FLEMING E. GREATHOUSE, OF TERRYTON, KANSAS.

CULTIVATOR.

1,301,557.          Specification of Letters Patent.          Patented Apr. 22, 1919.

Application filed December 18, 1918. Serial No. 267,277.

*To all whom it may concern:*

Be it known that I, FLEMING E. GREATHOUSE, a citizen of the United States, residing at Terryton, in the county of Finney and State of Kansas, have invented a new and useful Cultivator, of which the following is a specification.

This invention relates to cultivators, one of its objects being to provide a machine which, when drawn over a field, will produce a number of parallel furrows of desired depth so that when soil in level localities where high winds are prevalent, is thus worked, the high winds will not blow the moisture therefrom or carry off the fine top soil. On the contrary moisture will be collected in the furrows and absorbed by the soil, and the light top soil will collect in the furrows. Thus this method of treatment of the soil is of obvious importance where dry farming must be resorted to under the conditions mentioned.

Another object is to provide a machine of this character which is simple in construction and can be adjusted and operated readily.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a plan view of the cultivator, the draft tongue being broken away.

Fig. 2 is a section on line 2—2, Fig. 1.

Fig. 3 is a central longitudinal section.

Referring to the figures by characters of reference, I designate supporting wheels the axle 2 of which is preferably formed of a length of pipe which can project any desired distance beyond the wheels, said wheels being held against lateral shifting on the axle by clips 3 fastened on the axle. A draft tongue 4 is secured on and extends forwardly and rearwardly from the axle and is preferably provided with brace strips 5 the ends of which are connected to the axle. A seat 6 for the driver is mounted on the rear portion of the tongue.

Extending across the rear portion of the tongue in front of the seat 6 is a pipe 7 fastened to the tongue by U-bolts 8 or any other suitable devices. Side strips 9 of wood are mounted on the ends of the axle 2 and pipe 7 and are secured thereto to form a complete frame for the machine. Clips 10 are arranged in pairs on the axle 2 and to the clips of each pair are pivotally connected the lower terminals of a forked arm 11. Additional clips 12 are secured to the pipe 7 and have arms 13 extending therefrom. Each of these arms is provided with a longitudinal series of apertures 14 and extends between the sides of one of the forked arms 11 to which it is adjustably connected by a bolt extending through one of the apertures, as shown at 15.

To each pair of clips 10 and also to each pair of clips 3 is pivotally connected the forked front end of a beam 16 to the downwardly extended rear portion of which is connected a blade 17 for opening a furrow. To each of the beams 16 is connected a rod 18 which extends upwardly and is fastened between and to the sides of one of the arms 11. On each rod is mounted a spring 19 which acts to press the beam 16 and blade 17 downwardly. Obviously by adjusting the arm 11 upon the arm 13 the tension of the spring can be varied and the pressure of the blade upon the soil can be correspondingly varied.

Mounted on the tongue 4 above the axle 2 is a V-shaped standard 20 to the top of which is secured a pipe 21 forming a brace, this brace extending laterally from the standard to points near the wheel where it is bent rearwardly, as at 22 and fastened to the pipe 7. Brace straps are connected to the brace pipe 21 at the bends and extend downwardly and forwardly to the axle 2, these straps being shown at 23. An additional brace pipe 24 is secured at its center to the standard 20 and extends laterally and downwardly therefrom and is fastened at its ends to the axle 2 close to the wheels 1. Thus the machine is properly reinforced and will withstand rough use.

When the machine is drawn over a field the blades 17 will form parallel furrows for retaining moisture and protecting the ground from the drying action of the wind, the depth of the furrows depending upon the pressure exerted by the springs 19.

The connection between each rod 18 and its arm 11 is such that said rod is free to slide upwardly and downwardly, an eye 25 being preferably connected to the arm 11 and within which the rod will slide.

What is claimed is:—

1. A cultivator of the class described including an axle, a tongue secured thereon, a pipe secured on the rear portion of the tongue, connections between the ends of said pipe and the axle, supporting wheels on the axle, upwardly converging, adjustably connected arms upon the axle and pipe, beams pivotally connected to the axle, a connection between each of the beams and one of the arms thereabove, said connection being slidable in the arm, and a spring upon each of said connections and bearing downwardly upon the beam.

2. A cultivator of the class described including a wheel supported axle, a tongue thereon, a pipe upon the tongue and connected at its ends to the axle, upwardly extending crossed arms upon the axle and pipe and adjustably connected, beams connected to the axle, furrow opening blades upon the beams, rods extending from the beams and slidably engaging certain of the arms thereabove, and springs upon the rods and bearing downwardly upon the beams.

3. A cultivator of the class described including a wheel supported axle, a tongue thereon, a pipe secured to the tongue and connected at its ends to the axle, beams adjustably connected to the axle and pipe, a standard on the tongue, transverse braces on the standard and connected to the axle and pipe respectively close to and back of the wheels.

In testimony that I claim the foregoing as my own, I have hereto affixed my signature in the presence of two witnesses.

FLEMING E. GREATHOUSE.

Witnesses:
H. O. TRINKLE,
C. L. MARMON.

Copies of this patent may be obtained for five cents each, by addressing the "Commissioner of Patents, Washington, D. C."